Aug. 20, 1968          E. L. DOPIERALSKI          3,397,886
         SCORE SHEET FOR RECORDING INDIVIDUAL AND COMPOSITE SCORES
                         Filed Dec. 15, 1964

FIG.2                      FIG.1

*INVENTOR*
                                          EDMUND L. DOPIERALSKI
                                          BY, W. J. Shanley Jr.
                                                 *ATTORNEY*

United States Patent Office 3,397,886
Patented Aug. 20, 1968

3,397,886
SCORE SHEET FOR RECORDING INDIVIDUAL
AND COMPOSITE SCORES
Edmund L. Dopieralski, 26 Angelus Drive,
Rochester, N.Y. 14622
Filed Dec. 15, 1964, Ser. No. 418,451
10 Claims. (Cl. 273—54)

ABSTRACT OF THE DISCLOSURE

A bowling score sheet assembly having an individual-score sheet with score transfer means on the reverse side of the scoring spaces under the boxes for receiving pin scores, a composite-score sheet and an interposed score-exchange sheet which is located so that the pin scores entered on the individual score sheet are automatically transferred to the pin score boxes of the score-exchange sheet as the scores are entered. The scoring spaces of each vertical column of the score-exchange sheet being removable so that an exchange of pin scores can be made between contestants in transferring scoring boxes to the composite-score sheet.

---

This invention relates to improvements in score sheets of a type described in United States Patent 3,119,616, granted Jan. 28, 1964, to Edmund L. Dopieralski.

The aforesaid patent illustrates a score sheet that provides, in addition to the conventional individual score, a composite score for each contestant which is arrived at by exchanging the individual scores of contestants in accordance with a predetermined pattern. This results in providing a composite score for each contestant which gives a person of lesser bowling ability the opportunity of competing on equal terms with a contestant of much greater ability.

The score sheet of the patent has been found to be rather expensive to manufacture and also somewhat confusing to utilize since the scoring procedure utilized was found to be difficult to follow in practice because of the number of steps involved during the course of the contest.

In accordance with the scoring system of the patent, a score sheet, a set of slides, and a base member were utilized to generate, in addition to the normal individual score, the desired composite score. This system required the selection of a set of slides corresponding to the number of contestants. Thus, it was necessary to provide a different set of slides for each possible number of bowlers from 3 through 10. Provisions also had to be made for slidably receiving these slides. This resulted in unnecessarily increasing the cost of the resulting score sheet assembly. It was also necessary for each contestant to move the slide underlying the frame being bowled to a particular position prior to the entry of his score onto the top score sheet. This necessitated the repeated manipulation of the slides for each frame in which scores were to be exchanged and thus interfered with the proper enjoyment of the contest.

It is therefore an object of this invention to provide a new and improved system for scoring contests so as to provide individual and composite scores for each contestant.

It is another object of my invention to provide a new and improved system for scoring bowling contests which is simple to utilize and does not require the manipulation of elements during the bowling phase of the game.

It is yet a further object of my invention to provide a new and improved system for providing composite scores for bowling contests which is characterized by the utilization of a standard score sheet assembly which can be utilized by any number of bowlers up to ten in number.

These and other objects of my invention will become apparent as the following description proceeds, and features of novelty which characterize the invention will be pointed out with particularity in the claims annexed to and forming a part of this specification.

For a better understanding of the invention, reference may be had to the accompanying drawing, in which:

FIGURE 1 is a plan view of a score sheet assembly in which two of the score sheets are partially broken away to disclose the details of construction of underlying sheets; and FIGURE 2 is an end view of the bowling score sheet assembly of FIGURE 1.

In accordance with my invention, no intermediate manipulative steps need be taken during the bowling contest since I have provided a score-exchange sheet which is located under predetermined ones of the frames of the normal individual score sheet. Scores are automatically entered upon the score-exchange sheet during the entry of scores on the top individual-score sheet because of the provisions I have made for automatically transferring scores to the underlying score-exchange sheet. Thus, the initial step for exchanging scores is automatically provided without conscious effort on the part of the contestants. Thereafter, when the ten frames have been bowled and the conventional total individual scores have been computed and entered in the conventional spot upon the top score sheet, it may be folded back and then the scores upon the score-exchange sheet may be transferred to the composite score sheet where they are arranged in accordance with appropriate indicia to provide a composite score sheet which is substantially identical in appearance with the individual score sheet.

Referring now to FIGURE 1, score sheet assembly 1 is illustrated as comprising individual score sheet 2, composite score sheet 3, and interposed score-exchange sheet 4. Individual score sheet 2 may be identical in appearance with the conventional score sheet and differs only in the inclusion of transfer means which are located under the NAME column and under the boxes 9 provided in each scoring space. The transfer means are illustrated by dotted lines 10. Individual score sheet 2 thus comprises a NAME column, a SCORE column for receiving the total score, as well as the conventional ten columns for accommodating the scores during each of the ten frames of the game.

Score-exchange sheet 4 is illustrated as comprising nine vertical scoring columns for accepting the scores during frames 2–10 of the contest. Means is provided by attaching the right-hand edge of score-exchange sheet 4 to the underlying edge of composite score sheet 3 so as to permit it to be folded back along line 11 to expose fully the SCORE column of composite score sheet 3. It will be noted that score-exchange sheet 4 contains indicia, e.g., numerals 14 which correspond to the numeral 15 assigned to the contestants so as to later permit the scores in each score space on sheet 4 to be located on composite score sheet 3 in the scoring space bearing a like numeral and lying in the underlying column. In this way all the transferred scoring spaces affixed to sheet 3 bearing numeral 1 will be opposite contestant 1, etc.

The scoring spaces of score-exchange sheet 4 are removably supported so as to permit them to be rearranged in the underlying column of composite score sheet 3. In accordance with the preferred form of this invention, this may be conveniently accomplished by having the individual score spaces of the score-exchange sheet adhesively secured to an underlying base sheet 12. These scoring spaces may then be very conveniently secured to composite score sheet 3 through the action of adhesive material 13 which is retained on their back surfaces after removal from the base sheet. Once all the scores are exchanged by transferring scoring spaces to the composite-score sheet, the remaining base sheet 12 may be removed from composite-score sheet 3. Then each contestant's composite-score total may be computed in the conventional manner and entered in the SCORE column.

It is another feature of my invention to simplify the score-exchange procedure by leaving in one piece the scoring spaces that run in consecutive order so that only one large strip need be transferred rather than a plurality of individual scoring spaces.

In accordance with the preferred embodiment of the invention, provisions have been made to properly transfer or exchange scores among five or ten contestants without using blind scores. However, if fewer than five contestants are involved in a contest, a sufficient number of blind scores should be entered in the scoring space for each frame opposite the blank space in the NAME column to bring the total number of scores to five. Of course, it will be appreciated that if five or fewer contestants are involved, the score sheet assembly can be utilized for two games. A similar procedure should be followed if the number of contestants involved is greater than six but fewer than ten. Thus, a party of four will use a single blind score while a party of eight will use two blind scores. Blind scores may be all strike or strike-9-spare or any other desired repetitive scoring pattern for the ten frames of the blind score.

Provisions have also been made for permitting the contestants to utilize two lanes if more than six contestants are involved by exchanging scores among contestants 1–5 in frames 2–5. During these frames, contestants 6–10 also exchange scores among themselves. However, in frames 7–10 the scores of contestants 1–5 are exchanged with contestants 6–10 and vice versa. This score interexchange between the two groups of bowlers is facilitated by providing alternate indicia in frames 6–10.

Various changes or modifications in addition to those set forth herein may be made without departing from the spirit of this invention. For example, it is obvious that the same technique can be utilized in the scoring of golf without departing from the spirit of this invention the scope of which is commensurate with the following claims.

What I claim as new and desire to secure by Letters Patent of the United States is:

1. A score card for a plurality of contestants engaged in a contest in which the final-individual score of each contestant determines the individual score winning contestant and the final-composite score of each contestant determines the composite score winning contestant, the final-individual score for each contestant being the sum of the individual scores of that contestant for each of the plurality of fixed portions of the total contest, the final-composite score for each contestant being the sum of the individual scores of that contestant for fixed portions of the contest and individual scores of the other contestants assigned in sequence in other fixed portions of the contest, comprising the combination of an individual-score sheet having a first vertical side column divided into $n$ spaces for receiving the names of each contestant, said sheet being divided into N additional vertical columns, N being assigned to the number of fixed portions of the contest which make up the total contest, each of said N vertical columns being divided into $n$ scoring spaces for receiving the individual scores of contestants whose names are in horizontal alignment therewith, a score-exchange sheet divided into a plurality of vertical columns each of which is divided into $n$ scoring spaces, the scoring spaces of each column individually bearing distinctive indicia, means for positioning said score-exchange sheet below said individual-score sheet so its scoring spaces will only lie under scoring spaces of predetermined ones of said N columns of said individual-score sheet, means for transferring scores entered in the scoring spaces of said predetermined columns of said individual-score sheet onto the underlying scoring spaces of said score-exchange sheet, and a composite-score sheet divided into N vertical columns each of which is divided into $n$ spaces, the spaces of each column corresponding to said predetermined columns bearing indicia corresponding to said $n$ distinctive indicia, said scoring spaces of each column of said score-exchange sheet being removable from said sheet, at least some of said space being separable from the others in the same column so as to permit their placement in the spaces in the corresponding column of said composite-score sheet which bear the same indicia whereby the composite-score of each contestant may be developed.

2. The combination of claim 1 further comprising means for retaining said scoring spaces upon said composite-score sheet once they are placed thereon.

3. The combination of claim 2 in which said plurality is less than N, said combination further comprising means for positioning said composite-score sheet below said individual-score sheet with said score-exchange sheet interposed therebetween in a position such that one column of scoring spaces of said composite-score sheet will lie under scoring spaces of columns of said individual-score sheet other than one of said predetermined columns, and means for transferring scores entered in scoring spaces of said other column of said individual-score sheet onto the underlying scoring spaces of said composite-score sheet.

4. The combination of claim 3 in which said composite-score sheet also has a first vertical side column divided into $n$ spaces for receiving the names of each contestant, said combination further comprising means for transferring the names entered in said first vertical side column of said individual-score sheet onto the underlying name spaces of said composite-score sheet.

5. The combination of claim 4 in which said means for positioning said composite-score sheet comprises means for attaching it to said individual-score sheet along an edge next to said first vertical side columns so as to permit the individual-score sheet to be pivoted to expose the underlying score sheets.

6. The combination of claim 5 in which said individual-score and composite-score sheets each has a second vertical side column for entering total individual and composite scores, respectively, for each contestant.

7. The combination of claim 6 in which said means for positioning said score-exchange sheet comprises means for attaching it to said composite-score sheet along the edge next to said second vertical side column so as to permit the score-exchange sheet to be pivoted to expose the underlying composite-score sheet.

8. The combination of claim 7 in which said score-exchange sheet comprises a supporting member and a plurality of scoring spaces adhesively secured thereto in a manner permitting their removal from said supporting member.

9. The combination of claim 8 in which the adhesive is carried upon said scoring spaces upon their removal from said supporting member to thereby provide said retaining means.

10. The combination of claim 9 in which the scoring spaces in some of said predetermined columns of said composite-score sheet contain more than one mark of indicia.

References Cited

UNITED STATES PATENTS

| | | | |
|---|---|---|---|
| 1,634,240 | 6/1927 | Wilford. | |
| 2,089,247 | 8/1937 | Benson | 282—23 |
| 2,585,179 | 2/1952 | Silver | 282—23 |
| 2,980,446 | 4/1961 | Moss | 282—22 |
| 3,055,681 | 9/1962 | Forsyth et al. | 282—22 |
| 3,119,616 | 1/1964 | Dopieralski | 273—54 |
| 3,170,719 | 2/1965 | Kraus | 282—23 |

ANTON O. OECHSLE, *Primary Examiner.*